Aug. 18, 1970 R. L. VAN ANTWERP 3,524,652

LARGE TURNTABLE CONSTRUCTION

Filed Sept. 13, 1968

INVENTOR.

ROBERT L. VAN ANTWERP

BY Woodhams, Blanchard and Flynn

ATTORNEYS

United States Patent Office 3,524,652
Patented Aug. 18, 1970

3,524,652
LARGE TURNTABLE CONSTRUCTION

Robert L. Van Antwerp, St. Joseph, Mich., assignor to Maestro Corporation, Stevensville, Mich., a corporation of Michigan Filed Sept. 13, 1968, Ser. No. 759,612
Int. Cl. G11b 3/60
U.S. Cl. 274—39 2 Claims

ABSTRACT OF THE DISCLOSURE

A large turntable construction including a conventional turntable member and a plastic cover member secured to the turntable member and extending radially outwardly therebeyond to provide a larger diameter record-supporting upper surface. The cover is fixedly secured to the turntable member, as by an adhesive, and the portion thereof which extends beyond the periphery of the turntable member is of sufficient rigidity to provide adequate support for large diameter records. The cover is constructed of a material having sufficient resiliency to act as a record cushion so as to not damage the record at its point of support.

FIELD OF THE INVENTION

This invention relates in general to a record changer, and more particularly, to a new and improved large turntable construction for use in record changers.

BACKGROUND OF THE INVENTION

In the past, record changer turntables have conventionally been provided with a downwardly extending flange or skirt at the periphery thereof, which flange is engaged by an idler wheel driven by a motor so as to rotate the turntable. Heretofore, the overall size of record changer turntables has been somewhat limited by the fact that the turntable skirt must be positioned at a predetermined location, so as to be located for engagement with the idler wheel of existing drive mechanisms. Thus, the turntables employing a downwardly extending flange or skirt at the periphery thereof have been limited to sizes varying from between eight inches to nine and one-half inches in diameter. However, when playing a twelve inch record on such a conventional turntable, the peripheral edge of the record has extended a substantial distance outwardly beyond the turntable. With such turntables, it is apparent that the peripheries of the records are not rigidly supported and when a single record is rotating on the turntable, undesirable vibrations may be imparted to the record causing the overhanging portion of the record to vibrate at its resonant frequency.

In the past, many phonograph turntables have been enlarged so as not only to improve the appearance thereof but also to improve the reproduction performance when same is utilized to support twelve inch records. These prior large turntables have generally been constructed by utilizing a large size flat disk which is spot welded or otherwise secured to the top of a conventional turntable member, whereby the diameter of the turntable is thus enlarged. A further approach has been to utilize a special part which secures to the annular driving flange and extends outwardly therefrom so as to enlarge the turntable diameter. A still further prior art construction has utilized a radially outwardly extending lip intergrally secured to the driving flange or skirt. All of the above forms of construction incorporate a separate resilient cover on the top which acts as a record cushion.

While all of these prior art constructions have provided satisfactory support for twelve inch records, they have been undesirable in several respects. Specifically, the prior known two-piece turntable constructions have presented manufacturing, tolerance and resonance problems, whereas the prior known one-piece turntable constructions have created substantial tolerance problems as to the concentricity of the driving flange and the concentricity of the outer flange with respect to the rotational axis of the turntable. Thus, production of turntables of the above-described types has been unnecessarily costly and accordingly has resulted in large diameter turntables being considered and recognized as an expensive and deluxe feature in record changers.

Accordingly, the objects of this invention include:

(1) To provide a large diameter turntable for use in record changers which obviates many of the problems of the prior known large diameter turntables as noted above.

(2) To provide a large diameter turntable, as aforesaid, which utilizes a stiff cover or mat member secured to a conventional turntable member for enlarging the diameter thereof.

(3) To provide a large diameter turntable, as aforesaid, wherein the cover member is constructed of plastic and additionally functions to provide the record support surface.

(4) To provide a large diameter turntable, as aforesaid, which is simpler and more economical to manufacture than the prior known large diameter turntable constructions.

(5) To provide a large diameter turntable, as aforesaid, which reduces resonance problems and which improves play-back characteristics of the recorded information on the record disk.

(6) To provide a large diameter turntable, as aforesaid, in which the turntable is provided with a resilient surface for cushioning records when they are lowered onto the turntable.

(7) To provide a large diameter turntable, as aforesaid, having a sufficient diameter to provide rigid support for records, such as twelve inch records, resting thereon, and with sufficient mass to help to even out fluctuations in the rotational speed of the turntable.

(8) To provide a large diameter turntable, as aforesaid, which is of a highly desirable aesthetic design.

Other objects and purposes of this invention will be apparent to persons acquanted with apparatues of this general type upon reading the following specification and inspecting the accompanying drawings.

Figure 1:
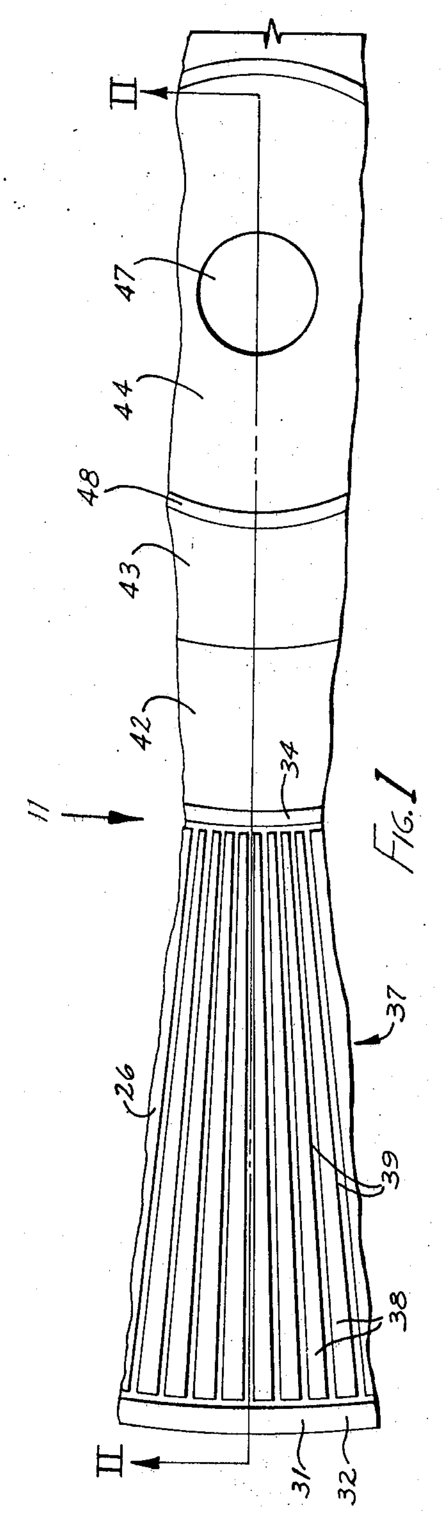
FIG. 1 is a partial, plan view of a large diameter turntable construction according to the present invention.

Certain terminology will be used in the following description for convenience and reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned derivatives thereof and words of similar import.

SUMMARY OF THE INVENTION

The objects and purposes of the present invention are met by providing a turntable construction wherein a conventional turntable member is provided with a radially extending cover fixedly secured thereto. In particular, the turntable member has a substantially flat upper surface thereon and is additionally provided with a downwardly extending driving flange or skirt adjacent the periphery thereof. The cover member comprises a flat, disk-like member molded from a stiff but resilient plastic material which is adapted to be mounted on the upper surface of the turntable member. The cover member has a lower surface which bears against the upper surface of the turntable member and is secured thereto, preferably by means of an adhesive. The lower surface of the cover member is further preferably provided with an arcuate annular rib which is positioned adjacent to and bears against the rounded upper edge of the turntable member so as to concentrically position the cover member thereon. The annular rib also supports the radially extending portion of the cover member, which portion extends radially outwardly beyond the skirt so as to form a diametrically enlarged record support surface. The upper surface of the cover member is provided with a pattern which provides an aesthetically desirable effect and serves to support the record evenly and flatly. In one form, there is provided a pair of radially spaced, upwardly projecting annular flanges defining a shallow recess therebetween, in which recess there is located record support means. The record support means may comprise a plurality of radially extending, upwardly projecting ribs separated by narrow grooves or recesses, the ribs preferably being integrally formed with the cover and defining a resilient record support surface.

DETAILS OF THE DESCRIPTION

Figure 2:
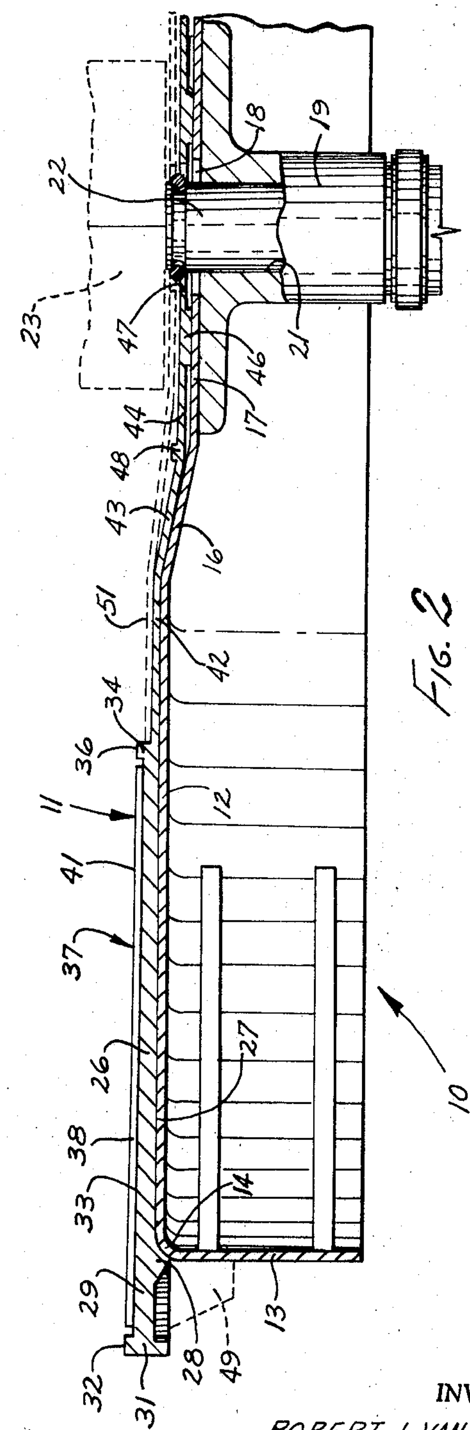
FIG. 2 is a partial, sectional view taken along the line II–II of FIG. 1.

FIGS. 1 and 2 illustrate therein a conventional turntable member 10, which turntable member is generally between eight and nine and one-half inches in diameter. Secured to the turntable member 10 is a cover member, indicated generally at 11, which in conjunction with the conventional turntable member 10 comprises a large diameter turntable construction according to the present invention.

The turntable member 10 comprises a conventional circular disk-like base 12 having a downwardly extending flange or skirt 13 provided at the periphery thereof. The upper corner or edge 14 of the turntable member is rounded in the conventional manner. As is well known, the skirt 13 is drivingly engaged by an idler wheel of a conventional drive mechanism (not shown) to impart the desired rotational speed to the turntable.

As illustrated in FIG. 2, the base 12 is provided with a central frusto-conical portion 16 which in turn is integrally connected to a central horizontal portion 17 provided with a central opening 18 therein. A hub 19 of conventional construction is fixedly secured to the center horizontal portion 17 by any convenient means and is additionally provided with a central bore 21 therethrough coaxially aligned with the central opening 18. A conventional record spindle 22 is supported within the bore 21 so that the hub 19 can rotate with respect to said spindle and said spindle extends upwardly beyond the upper surface of the turntable member 10. The record spindle 22 and the manner in which same is actuated is well known and further explanation is thus not believed necessary. Further, the spindle 22 can have a conventional 45 r.p.m. record adapter 23 (as indicated in dotted lines in FIG. 2) mounted thereon if desired.

The turntable member 10 and its structural relationship to the spindle 22, as explained above, are conventional and well known and do not comprise, by themselves, any significant change or improvement over the prior art devices. Rather, the present invention resides in the new and improved turntable cover 11 and the manner in which same cooperates with a conventional small diameter turntable member so as to produce a new and improved large diameter turntable construction.

The configuration of the cover member 11 is illustrated most clearly in FIG. 2 and comprises a flat, disk-like pad portion 26 having a flat bottom surface 27 which is adapted to bear against the upper surface of the circular base member 12. An annular continuous rib 28 extends downwardly from the bottom surface 27 and overlies and snugly engages the upper arcuate corner 14 of the turntable member 10 when the cover member is mounted thereon. The rib 28 is generally triangular in cross section and its radially inner wall is arcuate and of the same size and shape as the corner 14. The pad portion 26 further has an integral radially outwardly extending portion 29 which extends substantially beyond the skirt 13 so as to provide a diametrically enlarged record support surface. The extending portion 29 has a peripheral flange 31 integrally formed thereon and extending both upwardly and downwardly from the pad portion 26, which flange thus substantially increases the ragidity of the cover member 11. The peripheral flange 31 is provided with an upper surface 32 thereon which is spaced slightly upwardly from the upper surface 33 of the pad portion 26.

The pad portion 26 is provided with a further annular flange or rib 34 extending upwardly from the upper surface thereof, which rib 34 is spaced substantially radially inwardly of the peripheral flange 31. The flange 34 also has an upper surface 36 thereon which is spaced slightly above the upper surface 33 of the pad portion and is substantially coplanar with surface 32, whereby the upwardly extending flanges 31 and 34 thus define a shallow, channel-shaped recess therebetween.

Positioned within the channel-shaped recess between the flanges 31 and 34 is record support means 37 which, as illustrated in FIG. 1, comprises a plurality of narrow, radially extending ribs 38, which ribs are separated by small radially extending grooves 39. The upper surface 41 of the ribs 38 defines a substantially planar record support surface for supporting twelve inch records directly thereon without damaging the record grooves.

The cover member 11 is further provided with a reduced thickness, annular portion 42 which extends inwardly from the flange 34 as an integral extension of the pad portion 26. The radially inwardmost edge of the annular portion 42 is further integral with a frusto-conical portion 43 which in turn is secured to a central horizontal portion 44, which portion has a central opening 47 therein. The frusto-conical portion 43 and the central horizontal portion 44 are adapted to be positioned adjacent to the frusto-conical portion 16 and the central horizontal portion 17, respectively, of the turntable member 10 in the manner as illustrated in FIG. 2, the central horizontal portion 44 of the cover member being spaced from and supported on the central horizontal portion 17 of the turntable member by means of a downwardly extending flange 46 integrally formed on the lower surface of the central portion 44. The central portion 44 is further provided with an upwardly extending annular flange 48 thereon substantially adjacent the lower inwardmost extremity of the frusto-conical portion 43.

The cover member 11 is preferably molded as an integral one-piece member and is molded from a plastic material which is rigid enough to permit the formation of an integral turntable extension but yet is resilient enough to also act as a record cushion so as not to damage the record grooves. It has been found desirable to use a plastic material which has a Shore D hardness of from about 25 to 50 and which has a tensile yield strength of from about 400 to 900 p.s.i. and a flexural yield strength of from about 2500 to 4000 p.s.i. Specifically, it has been found desirable to make the cover member from an ethylene copolymer, such as ethylene ethyl acrylate copolymer and ethylene vinyl acetate copolymer, particularly a plastic sold under the trademark Zetafin 30, by Dow-Chemical Company.

As illustrated in FIG. 2, the pad portion 26 of the cover 11 increases in thickness from a minimum thickness adjacent the inner flange 34 to a maximum thickness adjacent the peripheral flange 31 so as to obtain the required stiffness for the overhang or extending portion 29 without the necessity of having to provide any additional material or stiffening devices. Further, the annular arcuate rib 28 adjacent the curved upper corner 14 of the turntable member provides additional stiffness at the point where the cover member naturally tends to flex when pressure is applied thereto, thereby additionally increasing the stiffness of the overall turntable construction.

The surfaces 32, 36 and 41 lie substantially within a plane that slopes at a very small angle with respect to a plane normal to the axis of rotation of the turntable. The angle of slope can lie within the range of between about ½ degree and 2 degrees, with the preferred angle of slope being about 1 degree. Thus, a record being placed on the turntable is supported essentially adjacent its peripheral edge. This has been found to minimize unwanted noise which might otherwise be reproduced due to the natural resonance of the record.

Also, the plurality of ribs 38 which constitutes the record support mat possesses sufficient resiliency so as to permit a record supported upon the spindle to be dropped into a playing position in contact with the mat without damaging the record grooves. Thus, the turntable construction according to the present invention eliminates the need to provide a separate record support mat or cushion as is conventional in the prior known turntable constructions.

The cover member 11 is preferably fixedly secured to the turntable member 10 by providing a suitable adhesive between the bottom surface 27 of the pad and the upper surface of the circular base member 12 whereby the cover member is thus easily and rigidly united to the turntable member 10 without requiring the use of any additional fastening means. Further, the concentricity of the cover member 11 with respect to the turntable member 10 is easily maintained due to the provision of the arcuate rib 28 on the bottom surface thereof and the manner in which same cooperates with the curved upper corner 14 of the turntable member.

As illustrated by the dotted lines in FIG. 2, the cover member 11 can additionally be provided with a plurality of circumferentially spaced, radially extending support ribs 49 underneath the overhang portion 29, which ribs extend downwardly from the arcuate rib 28 adjacent the outer periphery of the skirt 13. The support ribs 49 extend outwardly to a position at least close to the flange 31. Such support ribs 49 can be utilized to provide additional strength and rigidity to the overhang portion 29 if necessary.

As further illustrated by broken lines in FIG. 2, an annular plate 51, such as an aluminum plate, may be positioned over the cover 11 extending from the flange 34 to the opening 47. This plate is, however, not essential and can be omitted.

The embodiments of the invention in which an exclusive property or privilege is claimed are defined as follows:

1. A large diameter turntable construction, comprising:
a turntable having a generally circular base and a skirt portion extending dowardly from the base at the periphery thereof, said turntable further having an upper corner at the periphery of said base;
an integral unitary one-piece circular turntable cover made of a plastic material having a Shore D hardness of between 25 and 50, a tensile yield strength of between about 400 and 900 p.s.i. and a flexural yield strength of between about 2500 and 4000 p.s.i., said cover having an outer diameter substantially larger than the outer diameter of said base, said cover comprising a disk-like pad portion having a substantially flat support surface bearing against and fixedly secured to the upper surface of said base, said pad portion including a rim portion overhanging said base, said cover having an annular flange integrally connected to said pad portion and extending downwardly therefrom and spaced radially inwardly from the outer periphery thereof with said annular flange embracing the upper corner of the turntable, said pad portion having a thickness which progressively increases in the radially outwardly extending direction thereof and strengthens said overhanging portion, said cover having a second annular flange which includes a portion which extends upwardly from said pad portion for additionally strengthening said overhanging rim portion, said second flange portion having an upper surface adapted to support the rim of a large record, a plurality of integral, close spaced and narrow ribs upstanding from said pad portion, said ribs including portions extending substantially radially outwardly into said overhanging portion for resisting bending of said overhanging portion, said cover further having a third annular flange integral with and extending upwardly from said pad portion at a location spaced radially inwardly from said skirt of said turntable, the upper surfaces of said ribs and said third flange being substantially coplanar with said upper surface of said second flange for providing a resilient record support surface, said turntable base having a flat and unbroken upper surface and the lower surface of the cover being flat and lying adjacent said upper surface of the turntable base, and an adhesive between said surfaces and bonding said surfaces together.

2. A large diameter turntable construction according to claim 1 in which said first mentioned annular flange is of substantially triangular cross-section and extends radially more than axially of said cover for resisting bending of said overhanging portion by bracing said overhanging portion against said skirt portion of said turntable; and wherein:
said upper surfaces of said third flange, ribs and second flanges are disposed at heights above the lower surface of said pad portion gradually increasing radially outwardly therealong and defining a slightly dished record support surface.

References Cited

UNITED STATES PATENTS

| | | | |
|---|---|---|---|
| 3,346,262 | 10/1967 | Reed | 274—39 |
| 2,776,145 | 1/1957 | Caltagirone | 274—39 |
| 3,418,000 | 12/1968 | Sherwood | 274—39 |

LEONARD FORMAN, Primary Examiner

D. A. DEARING, Assistant Examiner